(12) United States Patent  
Goh

(10) Patent No.: US 8,797,361 B2  
(45) Date of Patent: Aug. 5, 2014

(54) IMAGE DISPLAY SYSTEM AND METHOD TO IDENTIFY IMAGES ACCORDING TO AN ASPECT RATIO OF AN EDITING LAYOUT

(75) Inventor: Ji-hyun Goh, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 12/218,352

(22) Filed: Jul. 15, 2008

(65) Prior Publication Data

US 2009/0146994 A1    Jun. 11, 2009

(30) Foreign Application Priority Data

Dec. 7, 2007 (KR) ........................ 10-2007-0126863

(51) Int. Cl.  
G09G 5/00 (2006.01)

(52) U.S. Cl.  
USPC ............ 345/651; 345/650; 715/243; 715/253

(58) Field of Classification Search  
CPC .. H04N 1/00196; G06T 11/60; G06T 3/4038; G06F 17/248  
See application file for complete search history.

(56) References Cited

U.S. PATENT DOCUMENTS 6,532,312 B1 * 3/2003 Corkran .................... 382/284  
7,689,909 B1 * 3/2010 Szuszczewicz ............ 715/243  
7,930,647 B2 * 4/2011 Skrenta ...................... 715/788  
2005/0235201 A1 * 10/2005 Brown et al. .............. 715/517  
2007/0136680 A1   6/2007 Skrenta

FOREIGN PATENT DOCUMENTS

JP        10-232916 A     9/1998  
JP      2007-199849 A     8/2007

OTHER PUBLICATIONS

University of Reading, "Using images in Word 2003", Jul. 2008, University of Reading, retrieved from "https://www.reading.ac.uk/web/FILES/using-images/Word.pdf" on Feb. 5, 2013.*  
C. Brian Atkins, "Adaptive Photo Collection Page Layout", 2004, IEEE, 2004 International Conference on Image Processing (ICIP), pp. 2897-2900.*  
Office Action issued for KR 10-2007-0126863 (Nov. 18, 2013).  
Notice of Allowance issued for KR 10-2007-0126863 (Apr. 16, 2014).

* cited by examiner

*Primary Examiner* — Ulka Chauhan  
*Assistant Examiner* — Robert Bader  
(74) *Attorney, Agent, or Firm* — Drinker Biddle & Reath LLP

(57) ABSTRACT

An image displaying system and method in which images that are categorized according to the aspect ratio of width of height thereof are displayed in a selection window and the images are put into and edited in an editing window, and an image display system employing the method. In the system and method, the aspect ratio of height to width of a layout of the editing window is determined, images having the same aspect ratio of height to width as the layout are detected and displayed in the selection window, an image is selected from among the displayed images, and the selected image is put into and edited in the layout.

12 Claims, 11 Drawing Sheets

IMAGE DISPLAY SYSTEM AND METHOD TO IDENTIFY IMAGES ACCORDING TO AN ASPECT RATIO OF AN EDITING LAYOUT

CROSS-REFERENCE TO RELATED PATENT APPLICATIONS

This application claims the benefit of Korean Patent Application No. 10-2007-0126863, filed on Dec. 7, 2007, in the Korean Intellectual Property Office, the entire contents of which is incorporated herein by reference.

BACKGROUND OF THE INVENTION

1. Field of the Invention

The present invention relates to an image displaying method for editing an image, such as that which is to be displayed on a printer screen, or for editing an image displayed on a terminal, such as a personal computer (PC), in order to make an electronic album, and an image display system employing the method.

2. Description of the Related Art

With the development of various types of digital devices, such as digital cameras, camcorders, and cellular phones, digital image data can be easily generated by capturing a photograph or a moving picture. Image data generated by a digital device can be printed on photographic paper or regular paper and then used in a manner similar to that of a conventional photograph. Also, generated image data can be stored in a storage medium in order to make an electronic album.

Image editing is generally viewed as indispensable for printing an image corresponding to image data or for making an electronic album. Recently, many servers can provide an editing function. For example, a server that provides an electronic album service program can provide an editing function so that a user can directly display and edit an image via a terminal.

In general, when an image is generated, the image width is different from the image height according to the structure of a digital device, and all images are displayed in a selection window for image editing. However, an electronic album program provided by a server typically displays an editing window with a predetermined layout. Thus, although the total number of images appropriate for the layout is limited, a user typically has to check all images and then select an image that is to be put into the layout.

SUMMARY OF THE INVENTION

The present invention provides an image displaying apparatus and method in which images that are categorized according to the aspect ratio of height to width are displayed in a selection window and then they are put into and edited in an editing window.

An embodiment of the present invention provides an image displaying method in which an image is selected from among a plurality of images displayed in a selection window and the selected image is put into a layout of an editing window. The method comprises determining the aspect ratio of height to width of a layout in the editing window, detecting an image whose aspect ratio of height to width is same as the aspect ratio of height to width of the layout; displaying the detected image in the selection window, and putting the image into the layout. Herein, the aspect ratio of an image or a layout means the aspect ratio of height to width of the image or the layout.

The step of determining of the aspect ratio of height to width of the layout may include determining whether the layout has a first aspect ratio or a second aspect ratio, where the first aspect ratio indicates that the width of the layout is greater than the height thereof and the second aspect ratio indicates that the width of the layout is less than the height thereof. The method may further include determining whether the image has the first aspect ratio or the second aspect ratio. Accordingly, if the layout has a first aspect ratio, the detection unit detects an image having the first aspect ratio. If the layout has a second aspect ratio, the detection unit detects an image having the second aspect ratio.

If a plurality of images whose aspect ratio of height to width is same as the aspect ratio of height to width of the layout are detected, the method may further include selecting an image that is to be put into the layout from among the detected images, and the selected image may be put into the layout. Also, if a plurality of layouts are included in the editing window, the method may further include selecting a layout into which the image is to be put from among the layouts, wherein the image may be put into the selected layout. If an image is present in the layout, the aspect ratio of height to width of the other region of the layout, excluding a region in which the image is present, may be determined.

Another embodiment of the present invention provides an image displaying method in which an image is selected from among a plurality of images displayed in a selection window and the selected image is put into a layout selected from among a plurality of layouts displayed in an editing window, where the aspect ratios of height to width of the layouts are different from one another. The method includes putting a first image into a first layout, determining a second layout, determining the aspect ratios of height to width of the first and second layouts; if the aspect ratio of height to width of the second layout is different from the aspect ratio of height to width of the first layout, detecting a second image having a different aspect ratio of height to width than the first image, displaying the second image in the selection window, and putting the second image into the second layout.

The step of determining of the aspect ratios of height to width of the first and second layouts may include whether the first and second layouts have a first aspect ratio or a second aspect ratio, where the first aspect ratio indicates that the width of a layout is greater than the height thereof and the second aspect ratio indicates that the width of a layout is less than the height thereof. The method may further include determining whether the second image has the first aspect ratio or the second aspect ratio. Thus, if the layout has the first aspect ratio, the detection unit may detect at least one image having the first aspect ratio. If the layout has the second aspect ratio, the detection unit may detect at least one image having the second aspect ratio.

If the second layout has the same aspect ratio of height to width as the first layout, the second image having the same aspect ratio of height to width as the first image may be detected. If a plurality of second images are detected, the method may further include displaying the detected second images in the selection window, and selecting an image that is to be put into the second layout from among the displayed second images, wherein the selected second image is put into the second layout.

Another embodiment of the present invention provides an image displaying method in which an image is selected from among a plurality of images displayed in a selection window and the selected image is put into the editing window. The method comprises detecting a first image having a first aspect ratio, where the first aspect ratio indicates that the width of an image is greater than the height thereof, detecting a second image whose aspect ratio of height to width is different from the first aspect ratio, displaying the first image in a first selection window, and displaying the second image into a second selection window. The first aspect ratio indicates that the width of an image may be greater than the height thereof, and the second aspect ratio indicates that the width of an image may be less than the height hereof.

A further embodiment of the present invention provides an image display system including a terminal including a display unit displaying a selection window displaying one or more images, and an editing window in which one of the one or more images displayed in the selection window is edited, an editing server including a detection unit detecting images having the same aspect ratio from among the images, and an editing unit into which the detected images are put to be edited.

In the editing window of the terminal, at least one layout may be displayed and the image may be put into and edited in the layout. The editing server may further include a layout aspect ratio determination unit determining the aspect ratio of height to width of the layout.

The layout aspect ratio determination unit of the editing server may determine whether the layout has a first aspect ratio or a second aspect ratio, where the first aspect ratio indicates that the width of a layout is greater than the height thereof, and the second aspect ratio indicates that the width of a layout is less than the height thereof. The editing server may further include an image aspect ratio determination unit determining whether the image has the first aspect ratio or the second aspect ratio. Thus, if the layout aspect ratio determination unit determines that the layout has the first aspect ratio, the detection unit of the editing server can detect an image having the first aspect ratio, which is determined by the image aspect ratio determination unit.

In the image display system, the display unit of the terminal can display an editing window having a plurality of layouts, and the layout aspect ratio determination unit of the editing server can compare the aspect ratio of a first layout with the aspect ratio of a second layout. If the layout aspect ratio determination unit determines that the aspect ratio of the first layout is same as that of the second layout, the detection unit of the editing server detects a second image whose aspect ratio is same as the aspect ratio of the first image put into the first layout. If the layout aspect ratio determination unit determines that the aspect ratio of the first layout is not same as that of the second layout, the detection unit detects a second image whose aspect ratio is not same as the aspect ratio of the first image put into the first layout. In the image display system, the terminal may further include an input unit receiving a signal for selecting an image that is to be put into the layout when a plurality of layouts are present or when a plurality of images that are detected or are used to determine the layout are present.

According to the embodiments of the present invention, a plurality of images can thus be categorized and displayed according to their aspect ratio of height to width, thereby reducing time and efforts required to select an image that is to be edited. In particular, according to the embodiments of the present invention, it is easy to edit images by determining the aspect ratio of a layout of an editing window, and then selecting and displaying images that can be put into and edited in the layout selection window.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown.

Figure 1:
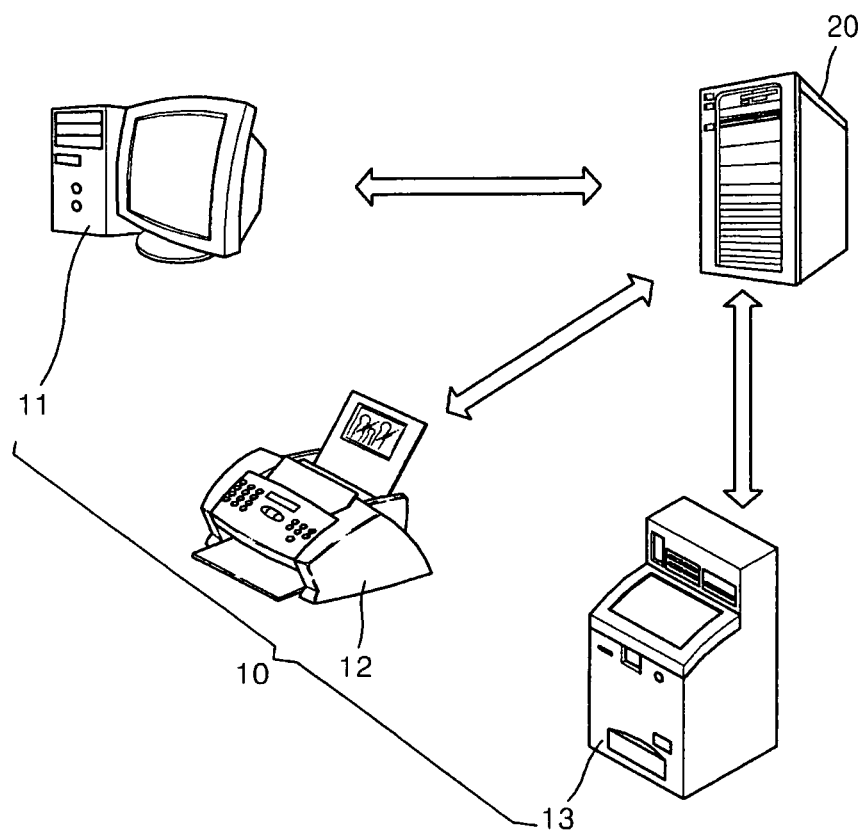
FIG. 1 illustrates a network of an image display system according to an embodiment of the present invention.

FIG. 1 illustrates a network of an image display system according to an embodiment of the present invention. Referring to FIG. 1, an editing server 20 receives a control signal, which is generated in response to a user's instructions, from a terminal 10, and then edits and manages an image according to the control signal. For example, the editing server 20 that can provide an electronic album service program, edit an image according to the electronic album service program and display the edited image on a screen of the terminal 10.

In the current embodiment of the present invention, the editing server 20 and the terminal 10 are separated from each other but the present invention is not limited to this arrangement. For example, the editing server 20 and the terminal 10 may be embedded together.

In this embodiment, the terminal 10 may be a digital device, such as a personal computer (PC) 11, a printer 12, or a kiosk 13. Although not illustrated in the drawings, the present invention can be applied to a mobile terminal, such as a cellular phone or a personal digital assistant (PDA), or any other suitable type of device.

Figure 2:
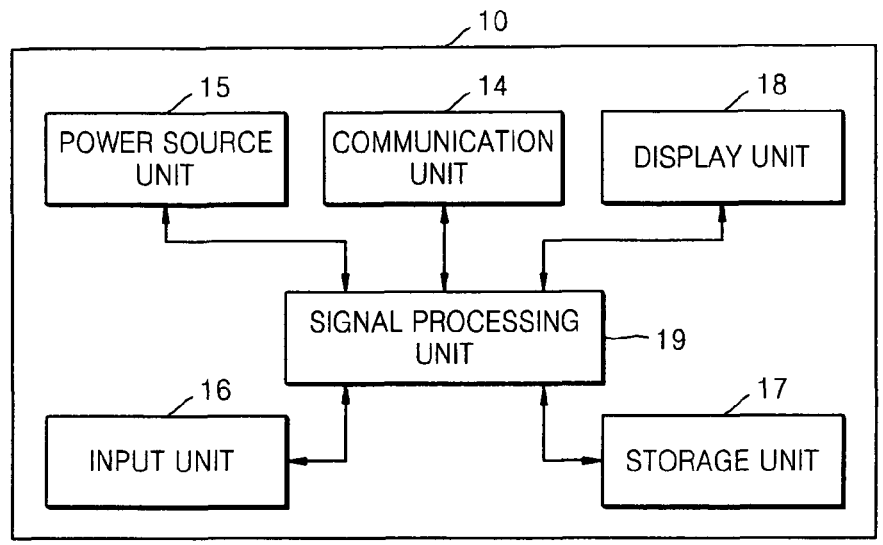
FIG. 2 is a block diagram of an example of a terminal of an image display system according to an embodiment of the present invention.

FIG. 2 is a block diagram of an example of a terminal 10 of an image display system according to an embodiment of the present invention. Referring to FIG. 2, the terminal 10 includes a communication unit 14, a power source unit 15, an input unit 16, a storage unit 17, a display unit 18 and a signal processing unit 19.

The communication unit 14 exchanges a control signal with the editing server 20 of FIG. 1. The terminal 10 transmits the control signal to the editing server 20 via the communication unit 14. The control signal enables a program stored in the editing server 20 to be executed. Then, the result of executing the program can be checked in the terminal 10.

Alternatively, the communication unit 14 can communicate in a wire or wireless manner with external devices other than the editing server 20 in order to receive data, such as an image file.

The power source unit 15 supplies predetermined power to the terminal 10. The power source unit 15 may have a built-in battery or an interface connected to an external power device.

An external signal for controlling the terminal 10 is applied to the input unit 16. The input unit 16 may be a button, a keyboard, a touch pad, or a touch screen, which is embedded with the terminal 10. Otherwise, the input unit 16 may be a remote controller which is disposed separately from the terminal 10. The storage unit 17 may store a program for operating the terminal 10, temporarily store image data of the image file that is to be processed, or store the image file.

The display unit 18 displays an editing window for displaying a layout, and a selection window for displaying an image that is to be put into the layout. According to a program, for example, an electronic album service program, provided by the editing server 20, either an editing window for editing an image or a selection widow for displaying at least one image that is to be put into the editing window may be displayed on the display unit 18. At least one layout may be displayed in the editing window. The display unit 18 may be an organic light-emitting diode (OLED), a liquid crystal display (LCD), or an electrophoresis display device (EDD). The signal processing unit 19 can provide a signal for controlling all the constitutional elements of the terminal 10 in order to control a desired operation to be performed.

Figure 3:
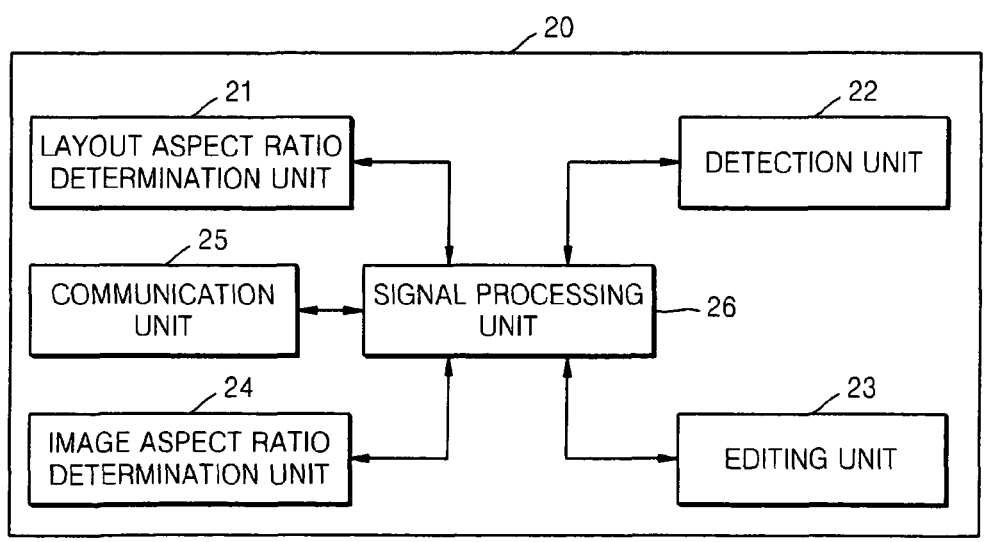
FIG. 3 is a block diagram of an example of an editing server of an image display system according to an embodiment of the present invention.

FIG. 3 is a block diagram of an example of an editing server 20 of an image display system according to an embodiment of the present invention. Referring to FIG. 3, the editing server 20 includes a detection unit 22 and an editing unit 23.

The detection unit 22 detects a plurality of images whose aspect ratio of height to width is the same and categorizes them into the same group. Also, the editing unit 23 edits one of the images categorized.

The editing server 20 may further include an image aspect ratio determination unit 24. If the width of an image is greater than the height thereof, the image aspect ratio determination unit 24 determines that the image has a first aspect ratio, or the image aspect ratio determination unit 24 may determine that the image has a landscape format. If the width of an image is less than the height thereof, the image aspect ratio determination unit 24 determines that the image has a second aspect ratio, or the image aspect ratio determination unit 24 may determine that the image has a portrait format. Thus, the image aspect ratio determination unit 24 can determine whether an image has the first aspect ratio or the second aspect ratio, and the detection unit 22 can detect images having the first aspect ratio or the second aspect ratio and classify the detected images into the same group.

Also, the editing server 20 may further include a layout aspect ratio determination unit 21. The layout aspect ratio determination unit 21 determines the aspect ratio of height to width of a layout displayed in an editing window.

The editing server 20 provides an editing window and a selection window, which are displayed on the display unit 18 of the terminal 10 of FIG. 1. For example, a process of putting an image into the editing window and editing the image is displayed on the editing window, and an image that is to be put is displayed on the selection window. In particular, the editing window may be a template which is selected by a user or is automatically selected according to a program of the editing server 20 from among predetermined templates, and may have at least one layout into which the image can be put. In the layout, the size of the image can be automatically adjusted. The layout aspect ratio determination unit 21 determines the aspect ratio of height to width of the layout.

More specifically, the layout aspect ratio determination unit 21 determines whether a selected layout has a first aspect ratio or a second aspect ratio, where the first aspect ratio indicates that the width of the layout is greater than the height thereof and the second aspect ratio indicates that the width of the layout is less than the height thereof. Alternatively, the layout aspect ratio determination unit 21 may determine whether a selected layout has a landscape format or a portrait format, wherein the landscape format corresponds to the first aspect ratio and the portrait format corresponds to the second aspect ratio. If the layout aspect ratio determination unit 21 determines that the layout has the first aspect ratio, the detection unit 22 detects images whose aspect ratio of height to width is same as the first aspect ratio. If the layout aspect ratio determination unit 21 determines that the layout has the second aspect ratio, the detection unit 22 detects images whose aspect ratio of height to width is same as the second aspect ratio.

Also, the layout aspect ratio determination unit 21 can compare a first layout aspect ratio with a second layout aspect ratio. For example, when a plurality of layouts are arranged in the editing window and a first image is included in a first layout, a user determines a second layout via the input unit 16 of the terminal 10. Next, the layout aspect ratio determination unit 22 determines whether the aspect ratio of height to width of the second layout is same as the aspect ratio of height to width of the first layout. If the first and second layouts are the same in terms of the aspect ratio of width to height, the detection unit 22 detects a second image having the same aspect ratio of height to width as the first image. If the first and second layouts are not the same in terms of the aspect ratio of width to height, the detection unit 22 detects a second image whose aspect ratio of height to width is different from the aspect ratio of height to width of the first image. The detected second image can be displayed in the selection window via the display unit 18 of the terminal 10.

Furthermore, if the first image is included in a region of the layout, the layout aspect ratio determination unit 21 can determine the aspect ratio of height to width of the other region of the layout. Then, it is possible to detect an image that can be appropriately arranged in the other region of the layout according to the determination made by the layout aspect ratio determination unit 21.

The communication unit 25 receives a control signal from the terminal 10, and transmits a control signal received from the layout aspect ratio determination unit 21, the detection unit 22, the editing unit 23, or the image aspect ratio determination unit 24 of the editing server 20 to the terminal 10. The signal processing unit 26 performs the overall signal processing in order to control the operations of the constitutional elements of the editing server 20 to be performed. In detail, the signal processing unit 26 processes a control signal corresponding to the determination made by the layout aspect ratio determination unit 21 and transmits the processing result to the detection unit 22. Otherwise, the signal processing unit 26 processes a control signal corresponding to a determination made by the image aspect ratio determination unit 24 and transmits the processing result to the detection unit 22. Thus, the detection unit 22 controls the terminal 10 to detect an image corresponding to the determination made by the layout aspect ratio determination unit 21 or by the image aspect ratio determination unit 24.

That is, it is possible to process a control signal received from the detection unit 22 and transmit the processing result to the communication unit 25 so that the control signal from the detection unit 22 can be transmitted to the terminal 10 via the communication unit 25. An image corresponding to the control signal can be displayed on the display unit 18 of the terminal 10. If a user selects a desired image from among displayed images via the input unit 16 of the terminal 10 and a control signal corresponding to the selected image is received via the communication unit 25, the signal processing unit 26 can transmit the control signal to the editing unit 23. The editing unit 23 controls the selected image to be displayed and edited in a layout of the editing window and/or the editing window, in response to the control signal. A control signal generated by the editing unit 23 is transmitted to the terminal 10 via the communication unit 25 so that the terminal 10 can perform image editing.

In addition, although not shown, the editing server 20 may further include a storage unit that stores at least one type of an editing window, information regarding the design, details and total number of layouts included in the editing window, at least one type of a selection window, and the program of the editing server 20. The editing server 20 may provide various types of editing windows and/or layouts. Accordingly, when a user selects a desired editing window and/or a layout from among the various types of the editing windows and/or layouts via the input unit 16 of terminal 10, the editing server 20 may provide the selected editing window and/or layout.

Figure 4:
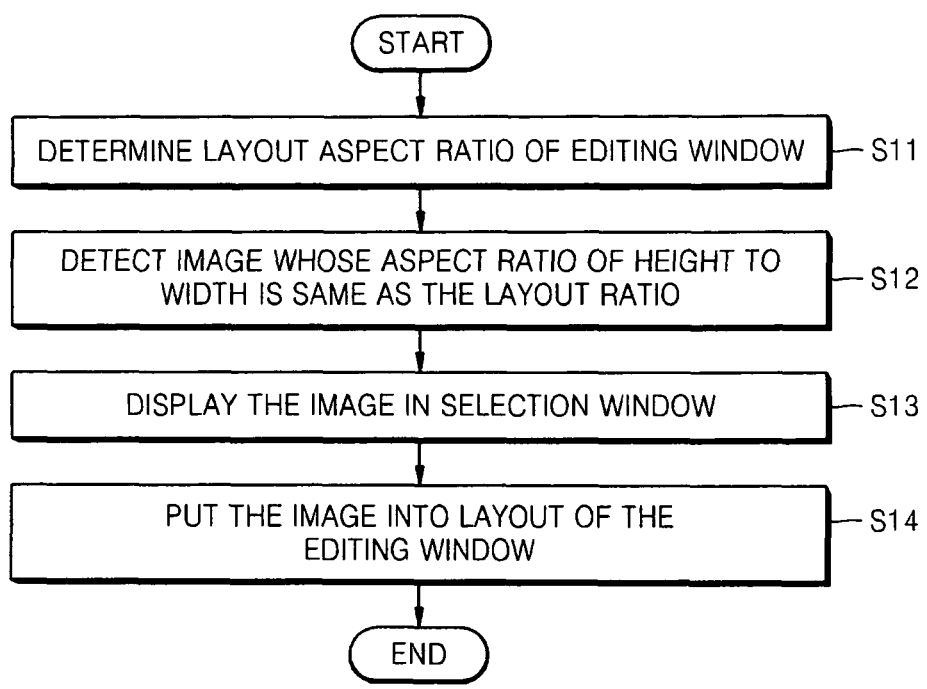
FIG. 4 is a flowchart illustrating an example of a method of displaying an image according to an embodiment of the present invention.

FIG. 4 is a flowchart illustrating an example of a method of displaying an image according to an embodiment of the present invention. As shown in FIG. 4, a layout aspect ratio of an editing window is determined in operation S11, and an image whose aspect ratio of height to width is same as the layout aspect ratio is detected in operation S12. Next, the image is displayed in a selection window in operation S13. Thereafter, the image is put into a layout of the editing window and is then edited in operation S14.

If a plurality of images are detected in operation S12, all the images can be displayed in the selection window so that a user can select a desired image from among the images displayed in the selection window. Then, the user can put the selected image into the layout of the editing window.

More specifically, images displayed on a display unit of a printer using the method illustrated in FIG. 4 according to an embodiment of the present invention will now be described with reference to FIGS. 5 and 6.

Figure 5:
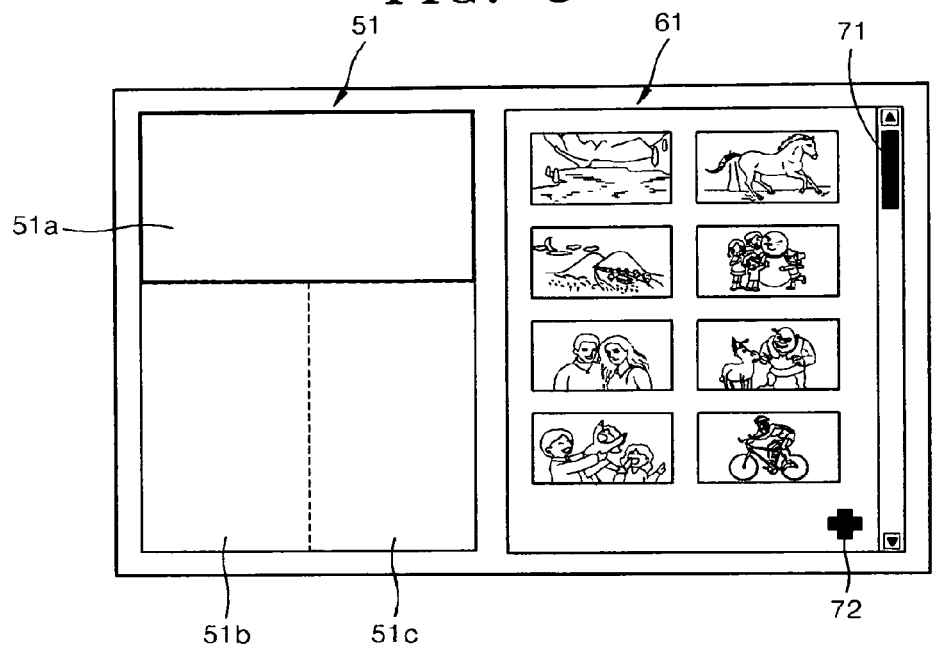
FIGS. 5 through 8 illustrate an example of images displayed on a terminal display unit of an image display system according to the method illustrated in FIG. 4.
Figure 6:
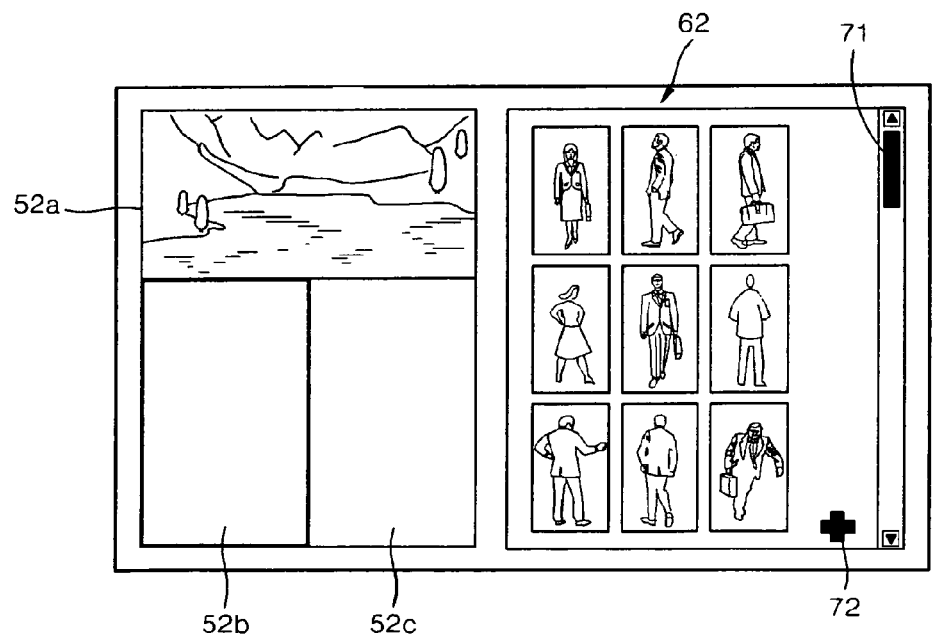

Referring to FIG. 5, an editing window 51 and a selection window 61 are displayed on a display unit of a printer, which is a type of a terminal. The editing window 51 includes a first layout 51a in which horizontal images can be arranged, and second and third layouts 51b and 51c are arranged below the first layout 51a. The editing window 51 may be a template that a user selects from among a plurality of layout templates stored in an editing server. Also, when the editing server provides the editing window 51 having a plurality of layouts, a layout is selected by a user or is automatically selected from among the layouts.

For example, if the first layout 51a is selected, the editing server controls the aspect ratio of height to width of the first layout 51a. If it is assumed that images displayed in the terminal illustrated in FIG. 5 are arranged in a forward direction, the width of the first layout 51a is greater than the height thereof and thus, the first layout 51a is considered to be a horizontal layout. Thus, the first layout 51a is selected as a horizontal layout, and an image that is to be put into the horizontal layout is detected. In other words, an image whose aspect ratio of height to width is same as the aspect ratio of height to width of the vertical layout is detected. In this case, an image whose width is greater than the height thereof is detected. Then, the detected image is displayed in the selection window 61 on the display unit of the terminal. In this case, one or more images may be detected.

For example, referring to FIG. 5, more than eight horizontal images are detected, and then only eight images are fully shown in the selection window 61 on the display unit. The other images that are not shown in the selection window 61 can be viewed by moving a scroll bar 71. Alternatively, it is possible to control all the images detected to be fully displayed in the selection window 61, or to display an icon 72 that can control either images whose aspect ratio of height to width is different than the currently displayed images or the other images to be displayed.

If a plurality of horizontal images whose aspect ratio of height to width is same as the aspect ratio of height to width of the first layout 51a are detected and displayed in the selection window 61, a user selects an image that is to be put into the first layout 51a from among the detected images via an input unit of the terminal. After the selected image is put into the first layout 52a, a second layout 52b is selected by the user or is automatically selected as illustrated in FIG. 6, and vertical images whose aspect ratio of height to width is same as the aspect ratio of height to width of the second layout 52b are detected. The detected images are displayed in the selection window 62, and then, an image is selected from among the displayed images and is put into the second layout 52b.

As another example, images displayed on a display unit of a PC using the method illustrated in FIG. 4 according to another embodiment of the present invention will now be described with reference to FIGS. 7 and 8. In this embodiment, it is assumed that an editing server provides an electronic album service.

Figure 7:
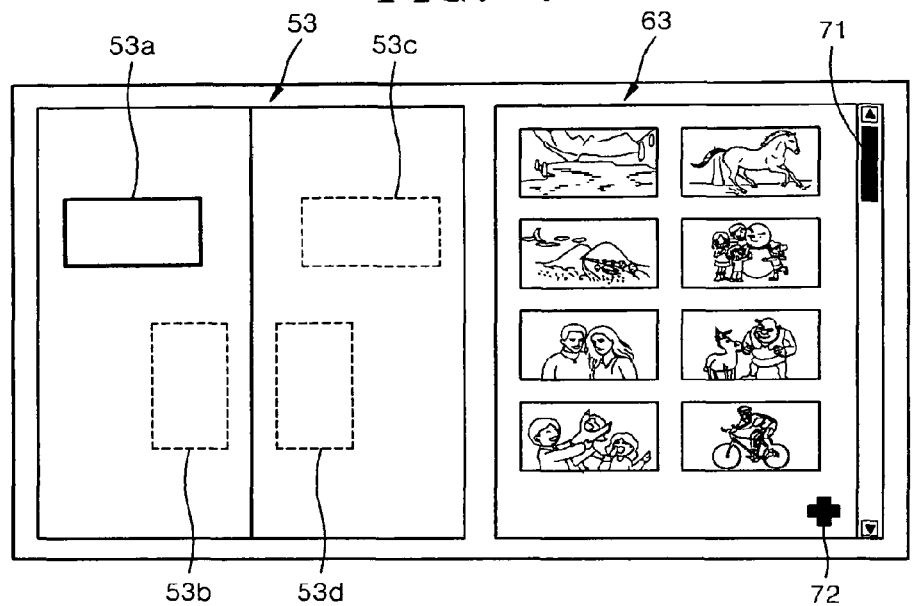

Referring to FIG. 7, one side of an electronic album is displayed in an editing window 53. In the displayed side of the electronic album, four layouts 53a, 53b, 53c, and 53d are arranged. In detail, the horizontal layouts 53a and 53c and the vertical layouts 53b and 53d are appropriately arranged in consideration of layout design. A plurality of layouts of various designs, which are to be displayed in the editing window 53, are stored in an external database connected to an editing server or an editing server, so that a user can select a desired layout from among the stored layouts or some of the stored layouts can be automatically selected.

Then, a layout, for example, the first layout 53a, is selected by the user or is automatically selected from among the four layouts 53a through 53d according to a program providing an electronic album, and the aspect ratio of height to width of the first layout 53a is determined. The first layout 53a has a horizontal layout whose width is greater than the height thereof, and thus, horizontal images whose width is greater than the height thereof are detected. Next, the detected images are displayed in a selection window 63, and one of the displayed images is selected and then is put into and edited in the first layout 53a.

Figure 8:
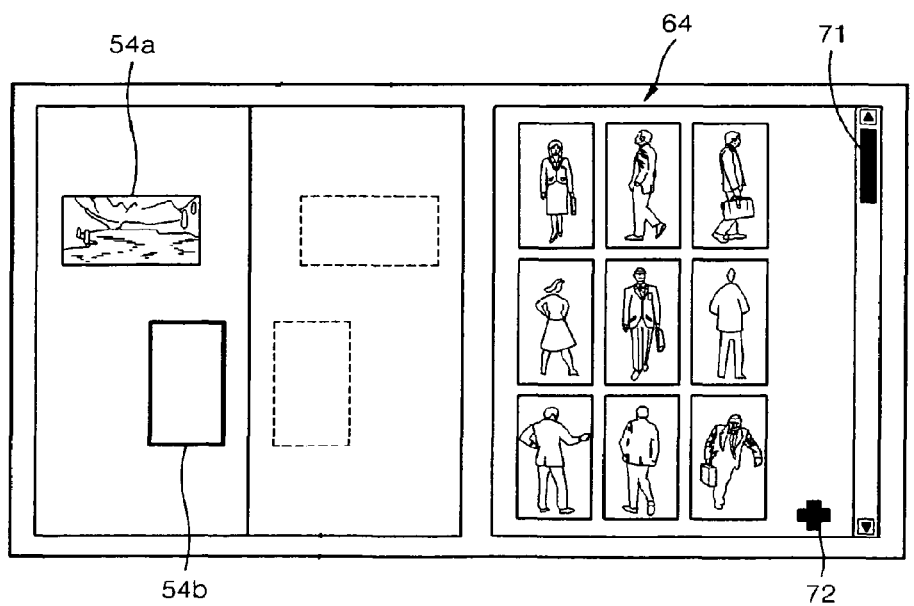

Referring to FIG. 8, after a first image is put into a first layout 54a, a second layout 54b is automatically selected according to a program executing an electronic album or is selected by a user. Then, since the second layout 54b corresponds to a vertical layout as a result of determining the aspect ratio of height to width of the second layout 54b, vertical images whose aspect ratio of height to width is same as the aspect ratio of height to width of such a vertical layout are detected. The detected images are displayed in a selection window 64. Then, an image is automatically selected according to the program or is selected by a user from among the images displayed in the selection window 64, and the selected image is put into the second layout 54b.

Hereinafter, a horizontal image will refer to an image with a first aspect ratio that indicates the width of the image is greater than the height thereof, and a vertical image will refer to an image with a second aspect ratio that indicates the width of the image is less than the height thereof. Similarly, a layout having the first aspect ratio may denote a horizontal layout, and a layout having the second aspect ratio may denote a vertical layout.

Figure 9:
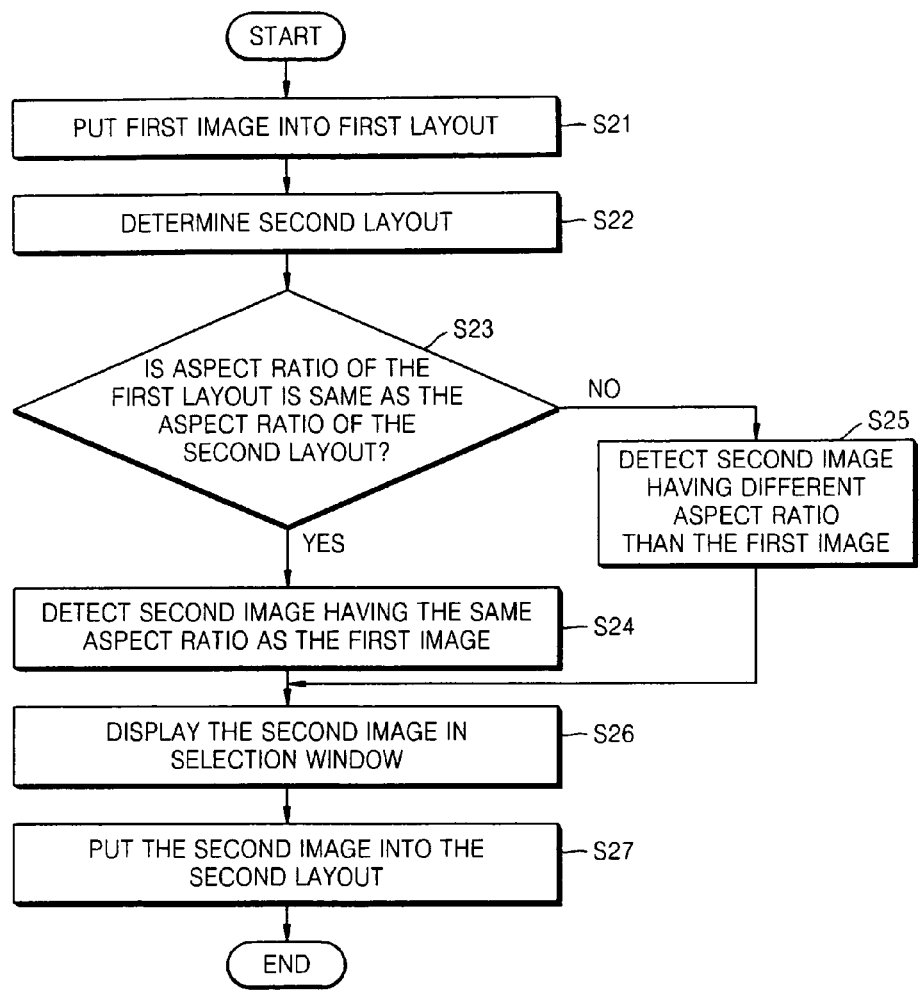
FIG. 9 is a flowchart illustrating an example of a method of displaying an image according to another embodiment of the present invention.

FIG. 9 is a flowchart illustrating an example of a method of displaying an image according to another embodiment of the present invention. In particular, FIG. 9 illustrates an example of an image displaying method in which a layout aspect ratio is determined and images are categorized according to the layout aspect ratio when a first layout is not predetermined to be a horizontal layout or a vertical layout, and a first layout is determined to be a horizontal layout if a horizontal image is put into the first layout or determined to be a vertical layout if a vertical image is put into the first layout.

Referring to FIG. 9, a first image is put into a first layout in operation S21. Next, a second layout is determined in operation S22. Next, it is determined whether the aspect ratio of height to width of the first layout is same as the aspect ratio of height to width of the second layout in operation S23. If the first and second layouts have the same aspect ratio of width to height, a second image having the same aspect ratio of height to width as the first image is detected in operation S24.

If the first and second layouts have different aspect ratios of height to width, a second image having a different aspect ratio of height to width than the first image is detected in operation S25. Then, the second image is displayed in a selection window in operation S26, and then is put into the second layout in operation S27.

Examples of images displayed on a display unit of a printer using the method illustrated in FIG. 9 according to embodiments of the present invention will now be described with reference to FIGS. 10 through 12.

Figure 10:
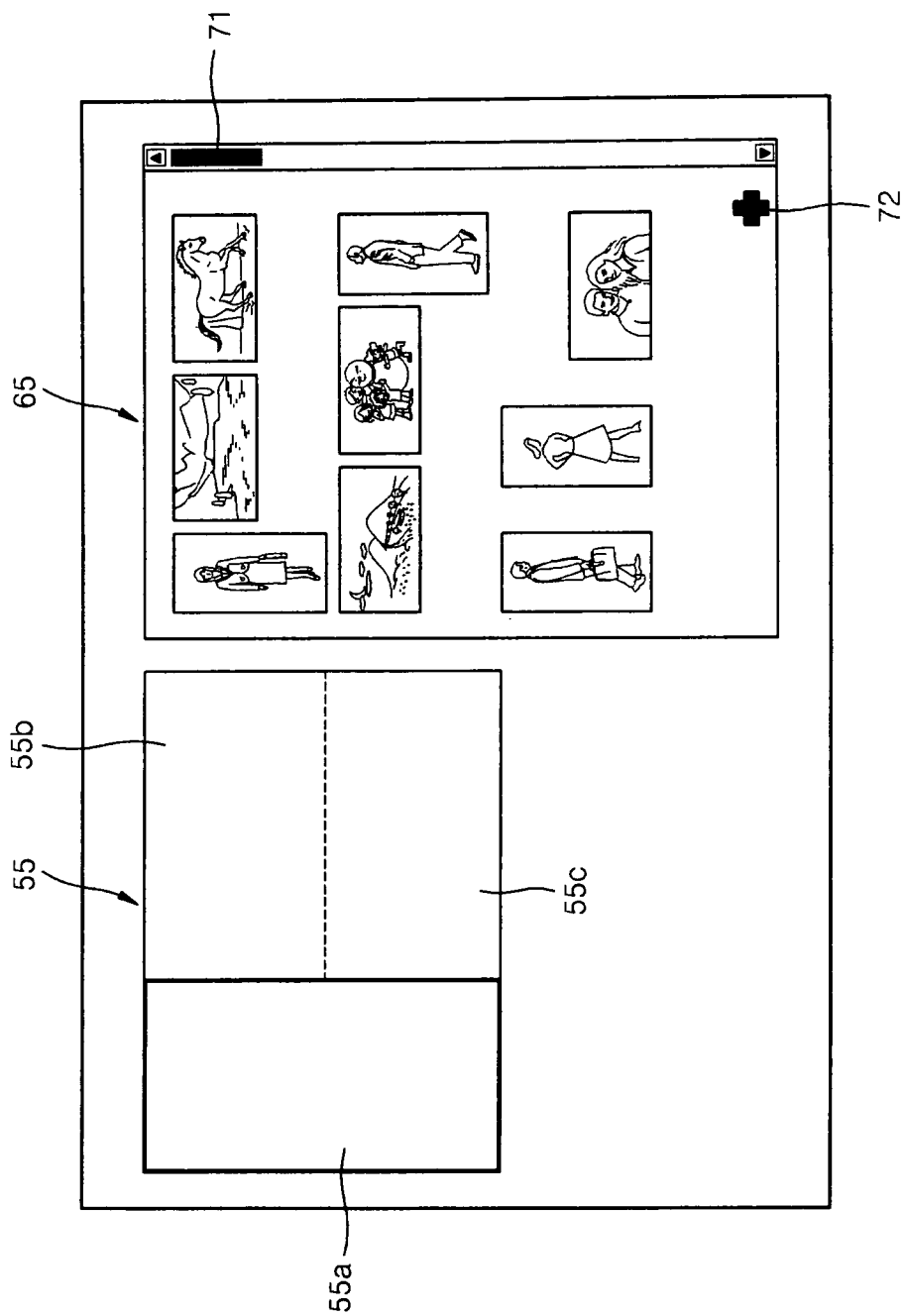
FIGS. 10 through 12 illustrate an example of images displayed on a terminal display unit of an image display system according to the method illustrated in FIG. 9.

Referring to FIG. 10, an editing window 55 and a selection window 65 are displayed on a display unit of a printer which is a type of a terminal. In the editing window 55, three layouts 55a, 55b, and 55c are displayed. The printer performs printing according to an image displayed in the editing window 55, and whether a printed output is a horizontal output or a vertical output is determined according to the image shape. Accordingly, whether the three layouts 55a, 55b, and 55c are a horizontal layout or a vertical layout has yet to be determined. Also, images that are to be put into the layouts 55a, 55b, and 55c displayed in the editing window 55 are randomly displayed in the selection window 65 without being categorized into several groups.

Figure 11:
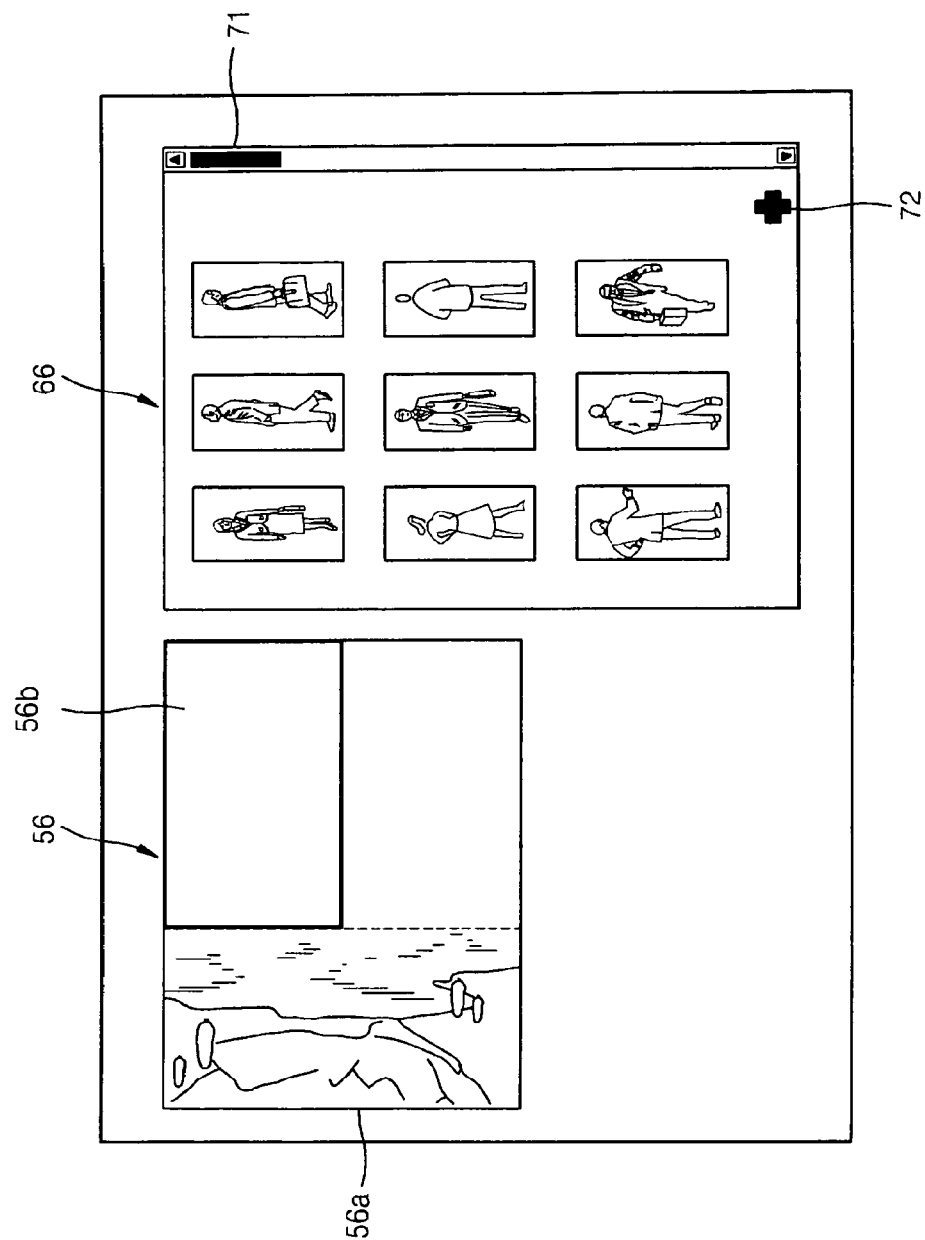

Referring to FIG. 11, a horizontal image is first disposed in a first layout 56a displayed in an editing window 56. Thus, the first layout 56a becomes a horizontal layout.

Next, a second layout 56b is determined. Since the aspect ratio of height to width of the second layout 56b is different than the aspect ratio of height to width of the first layout 56a, vertical images that are different from the horizontal image are detected. The detected vertical images are displayed in the selection window 66.

Figure 12:
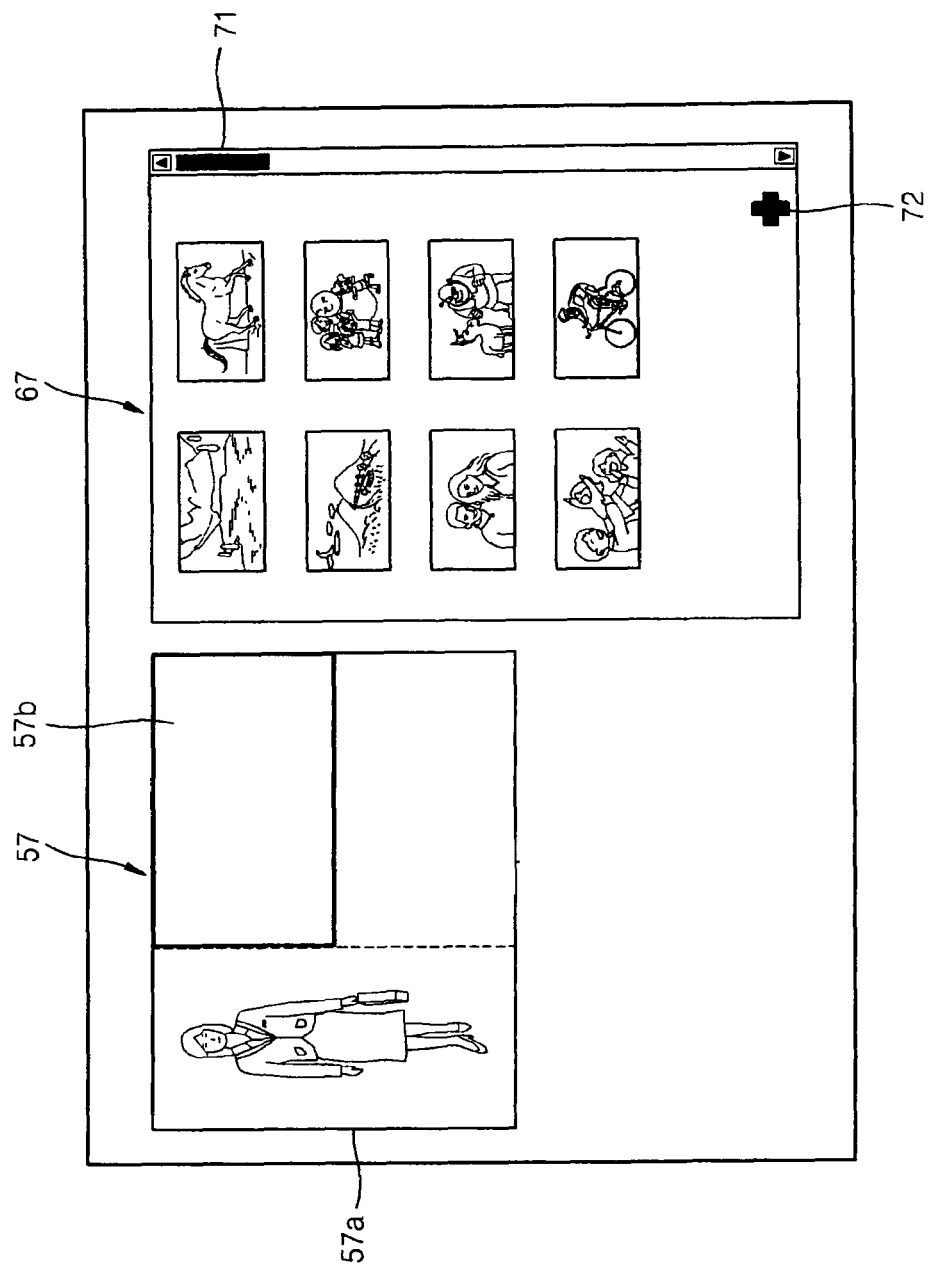

Referring to FIG. 12, a vertical image is first displayed in a first layout 57a of an editing window 57. Thus, the first layout 57a becomes a vertical layout. A second layout 57b has a different aspect ratio of height to width than the first layout 57a, and thus, a horizontal image can be detected and displayed in a selection window 67.

If the image displayed in the editing window 56 illustrated in FIG. 11 is printed, a vertical printed out is obtained. If the image displayed in the editing window 57 illustrated in FIG. 12 is printed, a horizontal output is obtained.

Figure 13:
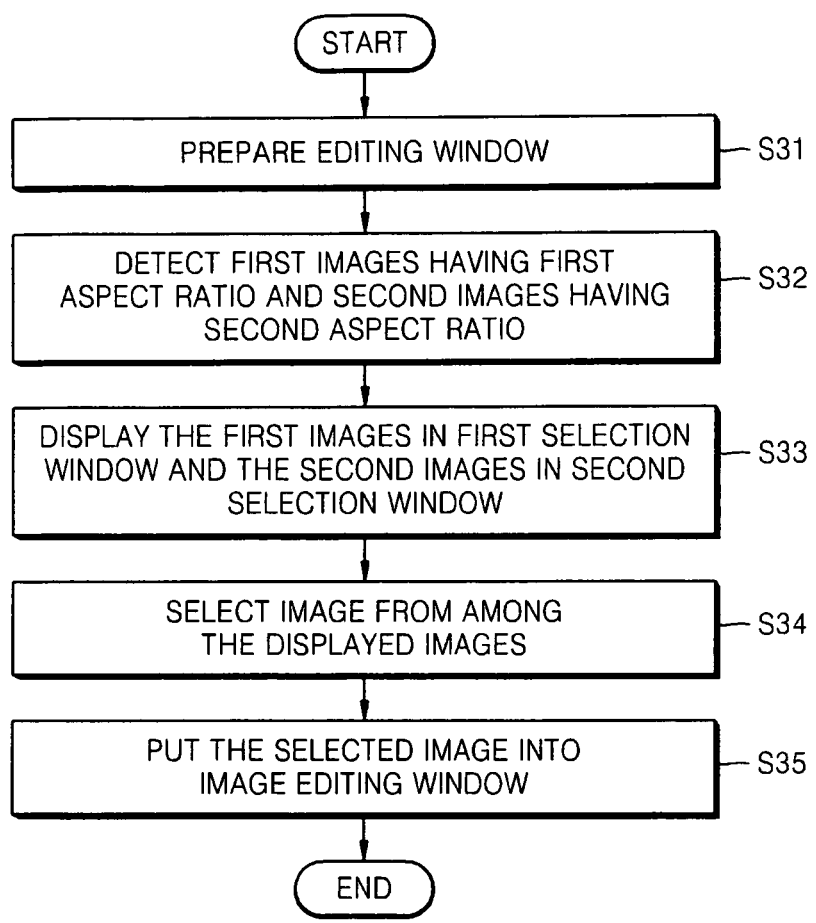
FIG. 13 is a flowchart illustrating an example of operations performed by a method of displaying an image according to another embodiment of the present invention.

FIG. 13 is a flowchart illustrating an example of a method of displaying an image according to another embodiment of the present invention. Referring to FIG. 13, an editing window is prepared in operation S31. Next, images are categorized according to the aspect ratio of height to width thereof in operation S32. In detail, first images whose width is greater than the height thereof, that is, images having a first aspect ratio, are detected, and second images whose width is less than the height thereof, that is, images having a second aspect ratio, are detected in operation S32.

Next, the first images are displayed in a first selection window, and the second images are displayed in a second selection window in operation S33. An image is then selected by a user or is automatically selected from among the images displayed in the first and second selection windows in operation S34.

Next, the selected image is put into an image editing window in operation S35. For example, a method of receiving an electronic album service program from an editing server and displaying an image on a display unit of a terminal according to an embodiment of the present invention will now be described with reference to FIG. 14.

Figure 14:
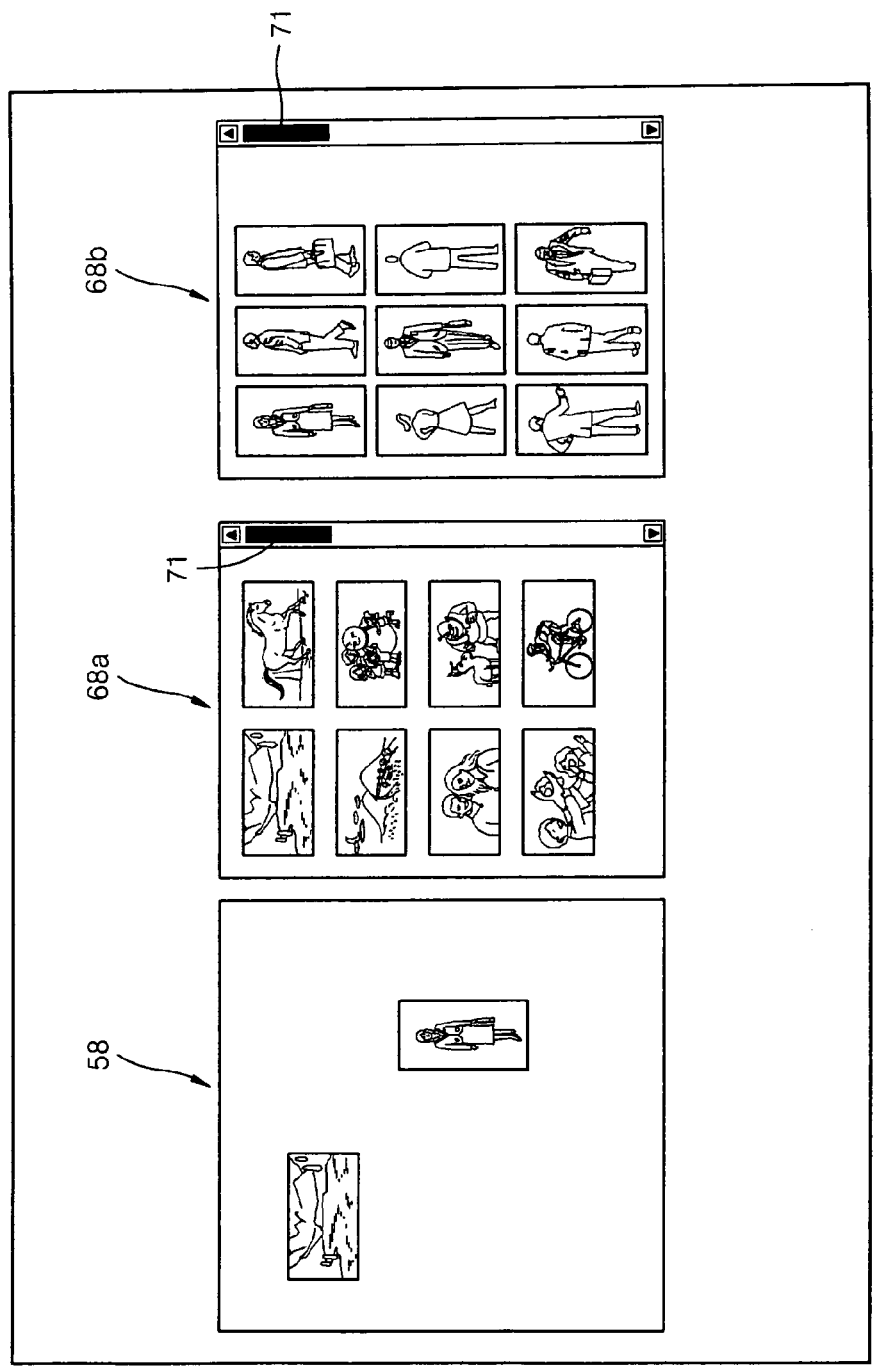
FIG. 14 illustrates an example of images displayed on a terminal display unit of an image display system according to the method illustrated in FIG. 13.

Referring to FIG. 14, an editing window 58 and one or more selection windows 68a and 68b are displayed. A plurality of horizontal images are displayed in the first selection window 68a, and a plurality of vertical images are displayed in the second selection window 68b. An image aspect ratio determination unit of the editing server can determine the aspect ratio of height to width of each of the images, and a detection unit can categorize the images into horizontal images whose width is greater than the height thereof and vertical images whose width is less than the height thereof based on the determination of the image aspect ratio determination unit. The categorized horizontal images and vertical images can be respectively displayed in the first selection window 68a and the second selection window 68b.

Then, images can be displayed in the editing window 58 having no layout, the aspect ratio of height to width of the other layout region is determined, and then, an image having a predetermined aspect ratio of height to width which can be appropriately displayed in the other layout region, can be displayed in the other layout region.

The above embodiments of a method of displaying an image according to the present invention have been described with respect to editing of an electronic album or editing of an image in order to print the image using a printing apparatus, but the present invention is not limited to this arrangement. For example, the present invention can be applied to image editing for outputting a collage using a kiosk.

While this invention has been particularly shown and described with reference to preferred embodiments thereof, it will be understood by those skilled in the art that various changes in form and details may be made therein without departing from the spirit and scope of the invention as defined by the appended claims.

What is claimed is:
1. An image displaying method comprising:
displaying, on a graphical user interface (GUI), an editing window and a separate selection window, wherein the editing window comprises first and second layouts and the selection window comprises a first plurality of images;

receiving a first signal, indicating a user's choice of a first image from the selection window to be placed in the first layout of the editing window, based on an interaction of the user with the GUI;

determining, using a processor, the first layout to be a horizontal layout when the first image is a horizontal image and determining the first layout to be a vertical layout when the first image is a vertical image irrespective of the aspect ratio of the first layout;

determining, using a processor, the aspect ratio of height to width of the first and second layouts;

displaying, in response to receiving the first signal, a second plurality of images in the selection window, wherein each image displayed in the selection window has a horizontal or vertical orientation that is the same as the first image when the first and second layouts have the same aspect ratio, and wherein each image displayed in the selection window has a horizontal or vertical orientation that is opposite to the first image when first and second layouts have opposite aspect ratios;

receiving a second signal, indicating the user's choice of a second image selected from the second plurality of images in the selection window to be placed in the second layout, based on a further interaction of the user with the GUI; and displaying the user-selected second image in the second layout.

2. The method of claim 1, wherein the determining of the aspect ratio of height to width of the first and second layouts comprises determining whether each layout has a first aspect ratio or a second aspect ratio, where the first aspect ratio indicates that the width of the layout is greater than the height thereof and the second aspect ratio indicates that the width of the layout is less than the height thereof.

3. The method of claim 2, further comprising determining whether each of the second plurality of images has the first aspect ratio or the second aspect ratio.

4. The method of claim 1, further comprising:
when a plurality of layouts are included in the editing window, receiving a selection of the first layout, into which the first image is to be displayed, from among the layouts.

5. The method of claim 1, further comprising, when the first image is placed in the first layout, determining the aspect ratio of height to width of a first region of the first layout, excluding a second region in which the image is present.

6. An image display system comprising:
a terminal including a display unit to display a selection window displaying one or more images, and an editing window in which one of the one or more images displayed in the selection window may be edited;
an editing server including a detection unit to identify a plurality of images having the same aspect ratio from among a plurality of images of different aspect ratios, and an editing unit into which the detected images are to be put to be edited; and
a graphical user interface (GUI) configured to:

display an editing window and a separate selection window, wherein the editing window comprises first and second layouts and the selection window comprises a first plurality of images;

receive a first signal, indicating a user's choice of a first image from the selection window to be placed in the first layout of the editing window;

determine the first layout to be a horizontal layout when the first image is a horizontal image and determining the first layout to be a vertical layout when the first image is a vertical image irrespective of the aspect ratio of the first layout;

display in response to the first signal, a second plurality of images in the selection window, wherein each image displayed in the selection window has a horizontal or vertical orientation that is the same as the first image when the first and second layouts have the same aspect ratio, and wherein each image displayed in the selection window has a horizontal or vertical orientation that is opposite to the first image when first and second layouts have opposite aspect ratios;

receive a second signal, indicating the user's choice of a second image selected from the second plurality of images in the selection window to be placed in the second layout; and display the user-selected second image in the second layout.

7. The system of claim 6, wherein in the editing window of the terminal, at least one layout is to be displayed and an image is to be displayed and edited in the layout, and
the editing server further comprises a layout aspect ratio determination unit to determine the aspect ratio of height to width of the layout.

8. The system of claim 7, wherein the layout aspect ratio determination unit of the editing server is to determine whether the first and second layouts have a first aspect ratio or a second aspect ratio, where the first aspect ratio indicates that the width of a layout is greater than the height thereof, and the second aspect ratio indicates that the width of a layout is less than the height thereof.

9. The system of claim 6, wherein the editing server further comprises an image aspect ratio determination unit to determine whether an image has a first aspect ratio or a second aspect ratio.

10. The system of claim 8, wherein the editing server further comprises an image aspect ratio determination unit to determine whether the image has the first aspect ratio or the second aspect ratio.

11. The system of claim 7, wherein in the editing window of the terminal, a plurality of said layouts is displayed and the one or more images displayed in the selection window are put into and edited in one or more layouts of the plurality of said layouts, respectively.

12. The system of claim 11, wherein the plurality of said layouts have different aspect ratios.

* * * * *